(12) United States Patent
Hochradi et al.

(10) Patent No.: US 10,792,837 B2
(45) Date of Patent: Oct. 6, 2020

(54) PROCESS FOR MANUFACTURING OF A FIBRE-REINFORCED POLYMER COMPOSITION

(71) Applicant: BOREALIS AG, Vienna (AT)

(72) Inventors: Stefan Hochradi, Linz (AT); Wolfgang Stockreiter, Puchenau (AT); Karl Wurm, Bad Zell (AT); Robert Gubo, Waizenkirchen (AT)

(73) Assignee: BOREALIS AG (AT)

(*) Notice: Subject to any disclaimer, the term of this patent is extended or adjusted under 35 U.S.C. 154(b) by 0 days.

(21) Appl. No.: 15/571,773

(22) PCT Filed: May 20, 2016

(86) PCT No.: PCT/EP2016/061374
§ 371 (c)(1),
(2) Date: Nov. 3, 2017

(87) PCT Pub. No.: WO2016/188883
PCT Pub. Date: Dec. 1, 2016

(65) Prior Publication Data
US 2018/0141240 A1    May 24, 2018

(30) Foreign Application Priority Data

May 22, 2015   (EP) ................................. 15168960

(51) Int. Cl.
| | |
|---|---|
| B29B 7/48 | (2006.01) |
| B29B 7/90 | (2006.01) |
| C08F 10/06 | (2006.01) |
| C08L 23/12 | (2006.01) |
| C08J 5/04 | (2006.01) |
| B29K 105/08 | (2006.01) |
| B29C 48/285 | (2019.01) |
| B29C 48/03 | (2019.01) |
| B29K 23/00 | (2006.01) |
| B29K 307/04 | (2006.01) |

(52) U.S. Cl.
CPC ............ B29B 7/487 (2013.01); B29B 7/90 (2013.01); C08F 10/06 (2013.01); C08J 5/042 (2013.01); C08L 23/12 (2013.01); B29C 48/03 (2019.02); B29C 48/2886 (2019.02); B29K 2023/12 (2013.01); B29K 2105/0809 (2013.01); B29K 2307/04 (2013.01); C08J 2323/12 (2013.01); C08J 2423/08 (2013.01); C08J 2423/20 (2013.01)

(58) Field of Classification Search
CPC .. B29B 7/487; B29B 7/90; C08F 10/06; C08J 5/042; C08L 23/12
See application file for complete search history.

(56) References Cited

U.S. PATENT DOCUMENTS

| | | | |
|---|---|---|---|
| 5,866,051 | A | 2/1999 | Lin et al. |
| 7,019,087 | B2 | 3/2006 | Mauk et al. |
| 2002/0098287 | A1 | 7/2002 | Bruessel |
| 2006/0104153 | A1 | 5/2006 | Yamaguchi et al. |
| 2006/0245294 | A1 | 11/2006 | Burkhardt |
| 2012/0141728 | A1 | 6/2012 | Ponsolle et al. |

FOREIGN PATENT DOCUMENTS

| | | |
|---|---|---|
| CN | 1217778 C | 9/2005 |
| DE | 19836787 A1 | 2/2000 |
| DE | 102012022340 A1 | 5/2014 |
| EP | 0343978 A2 | 10/1990 |
| EP | 1211046 A2 | 5/2003 |
| EP | 2251375 A1 | 11/2010 |
| SU | 402471 A1 | 10/1973 |
| WO | 1995/002496 A1 | 1/1995 |
| WO | 99/24478 A1 | 5/1999 |
| WO | 99/24479 A1 | 5/1999 |
| WO | 00/20189 A1 | 4/2000 |
| WO | 00/68315 A1 | 11/2000 |
| WO | 2002/093157 A1 | 11/2002 |

OTHER PUBLICATIONS

Russian Search Report for Application No. PCT/EP2016/061374, dated Aug. 20, 2018.
European Search Report dated Jul. 17, 2015.
European Office action for application No. 15 168 960.1-1014, dated Oct. 23, 2018.
European Office Action for Application No. 15 168 960.1-1014.
Office action for Chinese Application No. 2019012301762940, dated Jan. 25, 2019.

*Primary Examiner* — Edward J Cain
(74) *Attorney, Agent, or Firm* — Tarolli, Sundheim, Covell & Tummino LLP

(57) ABSTRACT

Process for producing a fibre-reinforced polymer composition comprising the following steps: a) providing a polymer composition, b) melting the polymer composition in a compounding device, c) feeding a non-woven fabric into the compounding device in the presence of the molten polymer composition, and d) withdrawing the fibre-reinforced polymer composition from the compounding device. Furthermore, the product obtained by the process and the use of a non-woven fabric in an extruder to reinforce a polymer with fibres are disclosed.

13 Claims, No Drawings

PROCESS FOR MANUFACTURING OF A FIBRE-REINFORCED POLYMER COMPOSITION

The present invention relates to a process for producing a fibre-reinforced polymer composition wherein a non-woven fabric is fed to a compounding device.

Fibre-reinforced polymer compositions usually combine good mechanical properties such as rigidity, impact resistance etc. with low weight making them particularly suitable for automotive applications, aircraft and ship construction, wind turbines etc. Moreover, the polymer can be chosen based on the desired properties of the application, e.g. chemical resistance, processability etc.

Adding fibres from endless rovings to a polymer can usually be easily accomplished with a homogenous distribution of the fibres in the polymer.

Depending on the chemical nature or source of the fibres preparation of rovings may not be possible. For example, natural fibres may not be processable into endless rovings or fibres originating from recycled material may already be present as relatively short fibres. In these cases the feeding techniques using rovings cannot be applied. Adding those fibres in pure form, i.e. wherein the fibres can more or less freely move with respect to each other, may cause uneven distribution of the fibres in the polymer as the fibres may stick together leading to an uneven distribution and/or clog the feeding means. Compensating for such an inhomogeneity by more thorough mixing the polymer after combination with the fibres is undesirably as the fibres tend to break during such compounding steps leading a to lower average length of the fibres and, thus, desired property profile may not be reached.

Thus, a process is desired wherein fibres can be combined with a polymer such that a distribution having high homogeneity is obtained.

It has surprisingly been found that feeding the fibres in form of a non-woven fabric is suitable to achieve a homogeneous distribution.

Therefore, the present invention provides a process for producing a fibre-reinforced polymer composition comprising the following steps
  a) providing a polymer composition (A);
  b) melting the polymer composition (A) in a compounding device;
  c) feeding a non-woven fabric into the compounding device in the presence of the molten polymer composition (A);
  d) withdrawing the fibre-reinforced polymer composition from the compounding device.

It has been surprisingly found that by using the reinforcing fibres as a non-woven fabric the fibres can be easily fed to the compounding device. Moreover constant dosing can be easily accomplished leading to a uniform distribution of the fibres in the fibre-reinforced polymer composition. Thereby the extent of mixing required to obtain the desired distribution is low. Moreover, the desired fibre content can be easily adjusted by regulating the feed speed of the non-woven fabric. Thus, allowing to produce fibre-reinforced polymer compositions with the different final fibre contents with no or only a short downtime of the apparatus.

The compounding device is preferably an extruder.

The non-woven fabric is preferably fed into the compounding device, preferably the extruder, through a side feed port. In such a case usually a side feeder is used which is well-known in the art. Such a side feeder preferably contains one or more screw(s), which preferably has (have) a diameter within the range of 10 to 150 mm, more preferably within the range of 10 to 100 mm and most preferably within the range of 20 to 60 mm.

By adjusting the speed of the side-feeder screw the amount of non-woven fabric dosed into the compounding device can be adjusted.

A suitable side-feeder is, for example, a Coperion ZSB40 twin screw side feeder.

The throughput of the process according to the present invention with respect to the polymer is preferably within the range of 25 to 4000 kg/h. The throughput usually depends on the production line used for the process.

The temperature during step c) is dependent on the melting temperature of the polymer, e.g. determined by DSC measurement. Preferably the temperature during step c) is not higher than 400° C., more preferably not higher than 350° C. and most preferably not higher than 300° C. In case of the use of an extruder as compounding device the temperature during step c) is determined as the barrel temperature.

In the present invention the non-woven fabric comprises reinforcing fibres usually selected from carbon fibres, glass fibres or mixtures thereof.

The total content of carbon and glass fibres in the non-woven fabric according to the present invention is preferably at least 65 wt. %, more preferably at least 75 wt. % and most preferably at least 80 wt. % based on the total weight of the non-woven fabric.

In one variant of the present invention the non-woven fabric contains at least 50 wt. % glass fibres, more preferably at least 75 wt. % glass fibres and most preferably at least 80 wt. % glass fibres based on the total weight of the non-woven fabric. Carbon fibres may be present in this variant usually in an amount of 15 wt. % or less, more preferably 10 wt. % or less and most preferably 5.0 wt. % or less based on the total weight of the non-woven fabric.

In another, preferred, variant the non-woven fabric comprises at least 50 wt. % carbon fibres, more preferably at least 75 wt. % carbon fibres and most preferably at least 80 wt. % carbon fibres based on the total weight of the non-woven fabric.

Glass fibres may be comprised in the non-woven fabric according to this another, preferred, variant according to the invention, usually in a small amount. The amount of glass fibres, if present in the non-woven fabric according to this another, preferred, of the invention, is usually 15 wt. % or less, more preferably 10 wt. % or less and most preferably 5.0 wt. % or less based on the total weight of the non-woven fabric.

The following applies to all variants of the invention unless otherwise explicitly mentioned to the contrary.

The carbon fibres, if present, preferably have an average length of from 0.5 to 300 cm, more preferably from 1.0 to 250 cm and most preferably from 1.5 to 200 cm.

The carbon fibers preferably have an average diameter of from 2 to 30 µm, more preferably from 3 to 25 µm and most preferably from 5 to 20 µm.

Preferably, the carbon fibers have a density of from 1.3 to 2.2 $g/cm^3$, more preferably from 1.4 to 2.1 $g/cm^3$, most preferably from 1.5 to 1.9 $g/cm^3$.

The non-woven fabric according to the invention may comprise polymeric compounds such as sizing agents and/or polymeric fibres.

In the present invention glass fibres and carbon fibres are not considered to be polymeric compounds.

If present, the amount of polymeric fibres is normally within the range of 0.25 to 10 wt. %, preferably within the range of 0.5 to 7.5 wt. % and most preferably within the range of 1.0 to 3.0 wt. % based on the total weight of the non-woven fabric.

Suitable polymeric fibres are for example polyester fibres.

The total amount of sizing agents usually 15 wt. % or less, more preferably 10 wt. % or less and most preferably 7.5 wt. % or less based on the total weight of the non-woven fabric. Such sizing agents for comprise example epoxy resins, polyether-modified epoxy resins, polyurethane, amino-silane grafted polypropylene. Film formers, lubricants, stabilizers and antistatic agents may also be comprised in the sizing agent. Preferably, the sizing agent comprises epoxy resins, preferably comprises polyether-modified epoxy resins. A suitable sizing agent is Duroxy SEF 968w distributed by Cytec.

As already outlined above, the process of the invention is suitable for recycled material which may contain these (and possibly also other) additional compounds besides the preferred carbon fibres.

Preferably, the non-woven fabric is in the form of a stripe. The useable width of the stripe depends on the feeding means used therefore. Usually the width of the stripe is not more than 300 mm. Preferably the stripe has a width of 10 to 300 mm, preferably a width of 25 to 250 mm and most preferably a width of 40 to 200 mm. The stripe preferably has a length of at least 50 cm, more preferably a length of at least 150 cm and most preferably a length of at least 250 cm.

The stripe may be in the form of a reel. Thus, the length is not particularly limited, i.e. the stripe may be a so-called "endless stripe".

The average weight of the non-woven fabric is preferably within the range of 100 to 1000 $g/m^2$, more preferably within the range of 150 to 800 $g/m^2$ and most preferably within the range of 250 to 650 $g/m^2$.

The preparation of non-woven fabrics from fibres, e.g. rovings, or recycled material which may be in the form of a laid web, is well-known in the art. Suitable processes are, for example needle punching and are well-known in the art.

Preferably, the non-woven fabric is in the form of a non-woven fabric, preferably obtained by needle-punching.

The weight ratio between polymer composition (A) and the non-woven fabric in the process according to the invention is preferably 99.0:1.0 to 25.0:75.0, more preferably 99.0:1.0 to 50.0:50.0 and most preferably 98.0:2.0 to 75.0:25.0.

Preferably polymer composition (A) comprises a polyolefin, more preferably comprises a polypropylene (PP). As will be readily appreciated polymer composition (A) is usually free of fibres prior to step c).

The content of the polyolefin, if present, preferably the preferred polypropylene (PP), is preferably at least 50 wt.-%, more preferably at least 70 wt.-%, still more preferably at least 75 wt.-% based on the polymer composition (A).

In the present invention the term "polypropylene" encompasses propylene homopolymer, propylene random copolymers, heterophasic polymers and mixtures thereof.

Moreover, the term "propylene copolymer" encompasses propylene random copolymers, heterophasic polymers and mixtures thereof.

As known for skilled person, random propylene copolymer is different from heterophasic polypropylene which is a propylene copolymer comprising a propylene homo or random copolymer matrix component (1) and an elastomeric copolymer component (2) of propylene with one or more of ethylene and $C_4$-$C_8$ alpha-olefin copolymers, wherein the elastomeric (amorphous) copolymer component (2) is dispersed in said propylene homo or random copolymer matrix polymer (1).

In one embodiment of the present invention, the polypropylene (PP) being present in the polymer composition (A) is a propylene homopolymer (H-PP1) and/or a propylene copolymer (C-PP1). For example, the polymer composition (A) comprises a propylene homopolymer (H-PP1) and a propylene copolymer (C-PP1). Alternatively, the polymer composition (A) comprises a propylene homopolymer (H-PP1) or a propylene copolymer (C-PP1). Preferably the amount of the polypropylene (PP) being a propylene homopolymer (H-PP1) and/or a propylene copolymer (C-PP1) in the polymer composition (A) is at least 50 wt.-%, more preferably at least 70 wt.-%, still more preferably at least 75 wt.-% based on the total amount of the polymer composition (A).

In one specific embodiment the polypropylene (PP) is a propylene copolymer (C-PP1), preferably a heterophasic propylene copolymer (HECO) as defined in detail below.

It is preferred that the polypropylene (PP) has a melt flow rate MFR2 (230° C., 2.16 kg) measured according to ISO 1133 of not more than 75 g/10 min, more preferably in the range of 2 to 50 g/10 min, still more preferably in the range of 5 to 30 g/10 min, like in the range of 10 to 25 g/10 min.

Additionally or alternatively, the polypropylene (PP) has a melting temperature Tm of at least 130° C., like in the range of 130 to 170° C.

For example, the polypropylene (PP) has a melt flow rate $MFR_2$ (230° C., 2.16 kg) measured according to ISO 1133 of not more than 75 g/10 min, more preferably in the range of 2 to 50 g/10 min, still more preferably in the range of 5 to 30 g/10 min, like in the range of 10 to 25 g/10 min, or a melting temperature Tm of at least 130° C., like in the range of 130 to 170° C. Preferably, the polypropylene (PP) has a melt flow rate $MFR_2$ (230° C., 2.16 kg) measured according to ISO 1133 of not more than 75 g/10 min, more preferably in the range of 2 to 50 g/10 min, still more preferably in the range of 5 to 30 g/10 min, like in the range of 10 to 25 g/10 min, and a melting temperature Tm of at least 130° C., like in the range of 130 to 170° C. In the following the polymer composition (A) and the polypropylene (PP) being part of the polymer composition (A) will be defined in more detail.

In one preferred embodiment of the present invention, the polypropylene (PP) is a propylene homopolymer (H-PP1). The expression propylene homopolymer as used throughout the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable.

Improved stiffness can be achieved due to the presence of a propylene homopolymer (H-PP1) with high molecular weight. Accordingly it is preferred that the propylene homopolymer (H-PP1) has a melt flow rate $MFR_2$ (230° C., 2.16 kg) measured according to ISO 1133 of not more than 75 g/10 min, more preferably in the range of 2.0 to 50 g/10 min, still more preferably in the range of 5.0 to 30 g/10 min, like in the range of 8.0 to 25 g/10 min.

Additionally or alternatively, the propylene homopolymer (H-PP1) has a melting temperature $T_m$ in the range of at least 140° C., preferably in the range of 140 to 170° C., more preferably in the range of 150 to 170° C., like in the range of 155 to 170° C.

Preferably, the propylene homopolymer (H-PP1) has a melt flow rate $MFR_2$ (230° C., 2.16 kg) measured according to ISO 1133 of not more than 75 g/10 min, more preferably in the range of 2.0 to 50 g/10 min, still more preferably in the range of 5.0 to 30 g/10 min, like in the range of 8.0 to 25 g/10 min; and a melting temperature $T_m$ in the range of at least 140° C., preferably in the range of 140 to 170° C., more preferably in the range of 150 to 170° C., like in the range of 155 to 170° C.

The propylene homopolymer (H-PP1) preferably features a low amount of xylene cold solubles (XCS), i.e. of ≤4.0 wt.-%, preferably in the range from 0.1 to 4.0 wt.-%, more preferably in the range from 0.1 to 3.0 wt.-% and most preferably in the range from 0.1 to 2.0 wt.-%.

The propylene homopolymer (H-PP1) is preferably an isotactic propylene homopolymer. Accordingly, it is appreciated that the propylene homopolymer (H-PP1) has a rather high isotactic pentad concentration, i.e. higher than 90 mol-%, more preferably higher than 92 mol-%, still more preferably higher than 93 mol-% and yet more preferably higher than 95 mol-%, like higher than 97 mol-%.

The propylene homopolymer (H-PP1) is state of the art and commercial available. A suitable propylene homopolymer is for instance Bormed HF955MO of Borealis AG.

In case the propylene homopolymer (H-PP1) is the main component in the polymer composition (A), i.e. in the amounts defined above, the polymer composition (A) usually has the same properties as the propylene homopolymer (H-PP1).

Additionally or alternatively, the polypropylene (PP) is a propylene copolymer (C-PP1). The term "propylene copolymer (C-PP1)" covers random propylene copolymers (RC-PP1) as well as complex structures, like heterophasic systems. Preferably the propylene copolymer (C-PP1) is a heterophasic propylene copolymer (HECO). The term "random propylene copolymer" denotes a copolymer of propylene monomer units and comonomer units, in which the comonomer units are randomly distributed in the polymeric chain. Thus, a random copolymer is different from a heterophasic copolymer comprising a matrix phase and an elastomeric phase dispersed therein, as described in detail below. Accordingly, the random propylene copolymer (RC-PP1) does not contain an elastomeric polymer phase dispersed therein, i.e. is monophasic and has just one glass transition temperature. However, the random propylene copolymer (RC-PP1) can be the matrix phase of a heterophasic propylene copolymer (HECO). The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures. Thus the random propylene copolymer (RC-PP1) preferably comprises, preferably consist of, units derived from
(i) propylene and
(ii) ethylene and/or at least one $C_4$ to $C_{20}$ α-olefin, preferably at least one α-olefin selected from the group consisting of ethylene, 1-butene, 1-pentene, 1-hexene and 1-octene, more preferably ethylene and/or 1-butene, yet more preferably ethylene.

Accordingly, the random propylene copolymer (RC-PP1) may comprise units derived from propylene, ethylene and optionally at least another $C_4$ to $C_{10}$ α-olefin. In one embodiment of the present invention, the random propylene copolymer (RC-PP1) comprises units derived from propylene, ethylene and optionally at least another α-olefin selected from the group consisting of $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably the random propylene copolymer (RC-PP1) comprises units derived from propylene, ethylene and optionally at least another α-olefin selected from the group consisting of 1-butene, 1-pentene, 1-hexene, 1-heptene, 1-octene, 1-nonene and 1-decene, wherein 1-butene and 1-hexene are preferred. It is in particular preferred that the random propylene copolymer (RC-PP1) consists of units derived from propylene and ethylene. Preferably, the units derivable from propylene constitutes the main part of the propylene copolymer (C-PP1), i.e. at least 80 wt.-%, more preferably of at least 85 wt.-%, still more preferably of 80 to 99.5 wt.-%, yet more preferably of 85 to 99.5 wt.-%, still more preferably of 90 to 99.2 wt.-%, based on the total weight of the random propylene copolymer (RC-PP1). Accordingly, the amount of units derived from $C_2$ to $C_{20}$ α-olefins other than propylene in the random propylene copolymer (RC-PP1) is in the range of 0.5 to 20 wt.-%, more preferably of 0.5 to 15 wt.-%, still more preferably of 0.8 to 10 wt.-%, based on the total weight of the random propylene copolymer (RC-PP1). It is in particular appreciated that the amount of ethylene in the random propylene copolymer (RC-PP1), in particular in case the random propylene copolymer (RC-PP1) comprises only units derivable from propylene and ethylene, is in the range of 0.5 to 20 wt.-%, preferably of 0.8 to 15 wt.-%, more preferably of 0.8 to 10 wt.-%, based on the total weight of the random propylene copolymer (RC-PP1).

Preferably, the random propylene copolymer (RC-PP1) is isotactic. Accordingly, it is appreciated that the random propylene copolymer (RC-PP1) has a rather high pentad concentration, i.e. higher than 95 mol-%, more preferably higher than 97 mol-%, still more preferably higher than 98 mol-%.

Additionally, it is appreciated that the random propylene copolymer (RC-PP1) has a melting temperature $T_m$ of at least 130° C., preferably in the range of 130 to 160° C., more preferably in the range of 130 to 158° C., like in the range of 140 to 155° C.

Concerning the melt flow rate $MFR_2$ (230° C.), is appreciated that the random propylene copolymer (RC-PP1) preferably has a melt flow rate $MFR_2$ (230° C.) measured according to ISO 1133 of not more than 75 g/10 min, more preferably in the range of 2.0 to 50 g/10 min, still more preferably in the range of 5.0 to 30 g/10 min, like in the range of 8.0 to 25 g/10 min.

In one specific embodiment of the present invention, the polypropylene (PP) is a heterophasic propylene copolymer (HECO) or a mixture of a heterophasic propylene copolymer (HECO) and propylene homopolymer (H-PP1) and/or a random propylene copolymer (RC-PP1), more preferably the polypropylene (PP) is a heterophasic propylene copolymer (HECO) or a mixture of a heterophasic propylene copolymer (HECO) and propylene homopolymer (H-PP1).

Accordingly the polymer composition (A) preferably comprises at least 50 wt.-%, more preferably at least 70 wt.-%, still more preferably at least 85 wt.-%, yet more preferably at least 95 wt.-%, like at least 97 wt.-% or 99 wt.-% of a heterophasic propylene copolymer (HECO). In one embodiment the polymer composition (A) consists of a heterophasic propylene copolymer (HECO).

In the following the heterophasic propylene copolymer (HECO) is defined in more detail.

Preferably the heterophasic propylene copolymer (HECO) comprises
a) a polypropylene matrix (M-HECO), and
b) an elastomeric propylene copolymer (E).

The expression "heterophasic" indicates that the elastomeric copolymer (E) is preferably (finely) dispersed at least in the polypropylene matrix (M-HECO) of the heterophasic propylene copolymer (M-HECO). In other words the elastomeric copolymer (E) forms inclusions in the polypropylene matrix (M-HECO). Thus, the polypropylene matrix (M-HECO) contains (finely) dispersed inclusions being not part of the matrix and said inclusions contain the elastomeric copolymer (E). The term "inclusion" according to this invention shall preferably indicate that the matrix and the inclusion form different phases within the heterophasic propylene copolymer (M-HECO), said inclusions are for instance visible by high resolution microscopy, like electron microscopy or scanning force microscopy.

Furthermore, the heterophasic propylene copolymer (HECO) preferably comprises as polymer components only the polypropylene matrix (M-HECO) and the elastomeric copolymer (E). In other words the heterophasic propylene copolymer (HECO) may contain further additives but no other polymer in an amount exceeding 5 wt.-%, more preferably exceeding 3 wt.-%, like exceeding 1 wt.-%, based on the total heterophasic propylene copolymer (HECO), more preferably based on the polymers present in the heterophasic propylene copolymer (HECO). One additional polymer which may be present in such low amounts is a polyethylene which is a reaction product obtained by the preparation of the heterophasic propylene copolymer (HECO). Accordingly, it is in particular appreciated that a heterophasic propylene copolymer (HECO) as defined in the instant invention contains only a polypropylene matrix (M-HECO), an elastomeric copolymer (E) and optionally a polyethylene in amounts as mentioned in this paragraph.

The elastomeric copolymer (E) is preferably an elastomeric ethylene copolymer (E1).

As explained above a heterophasic propylene copolymer (HECO) comprises a polypropylene matrix (M-HECO) in which the elastomeric propylene copolymer (E) is dispersed.

The polypropylene matrix (M-HECO) can be a propylene homopolymer (H-PP2) or a random propylene copolymer (RC-PP2).

However, it is preferred that the propylene matrix (M-HECO) is a propylene homopolymer (H-PP2).

The polypropylene matrix (M-HECO) being a propylene homopolymer (H-PP2) has a rather low xylene cold soluble (XCS) content, i.e. of not more than 3.5 wt.-%, preferably of not more than 3.0 wt.-%, like not more than 2.6 wt.-%, based on the total weight of the polypropylene matrix (M-HECO). Thus, a preferred range is 0.5 to 3.0 wt.-%, more preferred 0.5 to 2.5 wt.-%, still more preferred 0.7 to 2.0 wt.-% and most preferred 0.7 to 1.5 wt.-%, based on the total weight of the propylene homopolymer (H-PP2).

In one embodiment of the present invention, the polypropylene matrix (M-HECO) is a propylene homopolymer (H-PP2) having a melt flow rate $MFR_2$ (230° C.) from 1.0 to 500 g/10 min, more preferably of from 2.0 to 300 g/10 min, still more preferably of from 5.0 to 100 g/10 min and most preferably of from 8.0 to 80 g/10 min.

If the polypropylene matrix (M-HECO) is a random propylene copolymer (RC-PP2), the random propylene copolymer (RC-PP2) preferably comprises, preferably consist of, units derived from
(i) propylene and
(ii) ethylene and/or at least one $C_4$ to $C_8$ α-olefin, preferably at least one α-olefin selected from the group consisting of ethylene, 1-butene, 1-pentene, 1-hexene and 1-octene, more preferably ethylene and/or 1-butene, yet more preferably ethylene.

Accordingly, the random propylene copolymer (RC-PP2) may comprise units derived from (i) propylene and (ii) ethylene and/or at least one C4 to C8 α-olefin. In one embodiment of the present invention the random propylene copolymer (RC-PP2) comprises units derived from (i) propylene and (ii) an at least one α-olefin selected from the group consisting of ethylene 1-butene, 1-hexene and 1-octene. It is in particular preferred that the random propylene copolymer (RC-PP2) consists of units derived from propylene and ethylene. Preferably, the units derivable from propylene constitutes the main part of the random propylene copolymer (RC-PP2), i.e. at least 92 wt.-%, preferably of at least 95 wt.-%, more preferably of at least 98 wt.-%, still more preferably of 92 to 99.5 wt.-%, yet more preferably of 95 to 99.5 wt.-%, still more preferably of 98 to 99.2 wt.-%, based on the total weight of the random propylene copolymer (RC-PP2).

In one embodiment of the present invention, the random propylene copolymer (C-PP2) has a melt flow rate $MFR_2$ (230° C.) from 1.0 to 500 g/10 min, more preferably of from 2.0 to 300 g/10 min, still more preferably of from 5.0 to 100 g/10 min and most preferably of from 8.0 to 80 g/10 min.

The second component of the heterophasic propylene copolymer (HECO) is the elastomeric copolymer (E). As mentioned above the elastomeric copolymer (E) is preferably an elastomeric ethylene copolymer (E1).

Preferably the elastomeric propylene copolymer (E1) comprises units derived from (i) propylene and (ii) ethylene and/or C4 to C20 α-olefins, preferably from (i) propylene and (ii) selected from the group consisting of ethylene, 1-butene, 1-hexene, and 1-octene. Preferably the propylene content in the elastomeric propylene copolymer (E1) is at least 40 wt.-%, more preferably at least 45 wt.-%. Thus in one preferred embodiment the elastomeric propylene copolymer (E1) comprises 40.0 to 85.0 wt.-%, more preferably 45.0 to 80 wt.-%, units derivable from propylene. The comonomers present in the elastomeric propylene copolymer (E1) are preferably ethylene and/or C4 to C20 α-olefins, like ethylene, 1-butene, 1-hexene and 1-octene. In one specific embodiment elastomeric propylene copolymer (E1) is a propylene-ethylene polymer. In one embodiment of the present invention, the elastomeric propylene copolymer (E1) is an ethylene propylene rubber (EPR1) with the amounts given in this paragraph.

Preferably the amount of the elastomeric copolymer (E), like the elastomeric propylene copolymer (E1), within the heterophasic propylene copolymer (HECO) ranges from 15 to 45 wt.-%, more preferably in the range of 20 to 40 wt.-%, like in the range of 25 to 35 wt.-%.

The intrinsic viscosity (IV) of the xylene cold soluble (XCS) fraction of the heterophasic propylene copolymer (HECO) is preferably moderate. Accordingly, it is appreciated that the intrinsic viscosity of the xylene cold soluble (XCS) fraction of the heterophasic propylene copolymer (HECO) is below 3.3 dl/g, more preferably below 3.1 dl/g, and most preferably below 3.0 dl/g. Even more preferred the intrinsic viscosity of the xylene cold soluble (XCS) fraction of the heterophasic propylene copolymer (HECO) is in the range of 1.5 to 3.3 dl/g, more preferably in the range 2.0 to 3.1 dl/g, still more preferably 2.2 to 3.0 dl/g.

It is especially preferred that heterophasic propylene copolymer (HECO) comprises a propylene homopolymer (H-PP2) as the polypropylene matrix (M-HECO) and an ethylene propylene rubber (EPR1) as the elastomeric propylene copolymer (E1).

Preferably, the heterophasic propylene copolymer (HECO) has a melt flow rate MFR2 (230° C.) of not more than 75 g/10 min, more preferably in the range of 2 to 50 g/10 min, still more preferably in the range of 5.0 to 30 g/10 min, like in the range of 8.0 to 25 g/10 min.

In one embodiment, the instant fiber reinforced polymer composition comprises a heterophasic propylene copolymer (HECO) as the polypropylene (PP).

In another embodiment, the instant fiber reinforced polymer composition comprises a heterophasic propylene copolymer (HECO) and a propylene homopolymer (H-PP1) as the polypropylene (PP).

In this case, it is appreciated that the heterophasic propylene copolymer (HECO) and the propylene homopolymer (H-PP1) are present in the instant fiber reinforced polymer composition in a specific weight ratio in order to ensure well-balanced mechanical properties at low density. In particular, it is preferred that the heterophasic propylene copolymer (HECO) and the propylene homopolymer (H-PP1) are present in the instant fiber reinforced polymer composition in a weight ratio ranging from 3:1 to 1:3, more preferably from 2:1 to 1:2, such as of about 1:1.

In another embodiment, especially if very high stiffness is required rather than high impact performance, the instant fiber reinforced polymer composition comprises a propylene homopolymer (H-PP1) only as the polypropylene (PP).

The polypropylene (PP) may comprise a nucleating agent which is preferably a polymeric nucleating agent, more preferably an alpha-nucleating agent, e.g. a polymeric alpha-nucleating agent.

The nucleating agent is preferably present in H-PP1, RC-PP1, M-HECO, H-PP2, C-PP2, and/or as a masterbatch as defined herein, if present.

The (alpha)-nucleating agent content of the polypropylene (PP), or of one of its components, preferably of the polypropylene (PP), is preferably up to 5.0 wt.-%. In a preferred embodiment, the polypropylene (PP) or of one of its components, preferably of the polypropylene (PP), contains not more than 3000 ppm, more preferably of 1 to 2000 ppm of a (α)-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, vinylcycloalkane polymer, vinylalkane polymer, and mixtures thereof.

In a preferred embodiment the polypropylene (PP) or one of its components contains a vinylcycloalkane, like vinylcyclohexane (VCH), polymer and/or vinylalkane polymer, as the preferable alpha-nucleating agent. Preferably in this embodiment the polypropylene (PP) contains a vinylcycloalkane, like vinylcyclohexane (VCH), polymer and/or vinylalkane polymer, preferably vinylcyclohexane (VCH).

The nucleating agent can be introduced as a masterbatch. Alternatively some alpha-nucleating agents as defined in the present invention, can be also introduced by BNT-technology as described below.

The nucleating agent may be introduced to the polypropylene (PP) or one of its components e.g. during the polymerisation process of the polypropylene (PP) or one of its components or may be incorporated to the propylene copolymer in the form of masterbatch (MB) together with e.g. a carrier polymer.

In case of the embodiment of a masterbatch (MB) incorporation the masterbatch (MB) contains a nucleating agent, which is preferably a polymeric nucleating agent, more preferably alpha-nucleating agent, most preferably a vinylcycloalkane, like vinylcyclohexane (VCH), polymer and/or vinylalkane polymer, preferably vinylcyclohexane (VCH) polymer, as defined above or below, in an amount of not more than 500 ppm, more preferably of 1 to 200 ppm, and still more preferably of 5 to 100 ppm, based on the weight of the masterbatch (MB) (100 wt. %). In this embodiment, more preferably, said masterbatch (MB) is present in an amount of not more than 10.0 wt.-%, more preferably not more than 5.0 wt.-% and most preferably not more than 3.5 wt.-%, with the preferred amount of masterbatch (MB) being from 1.5 to 3.5 wt.-%, based on the total amount of the polypropylene (PP). Most preferably the masterbatch (MB) comprises, preferably consists of the homopolymer or copolymer, preferably homopolymer, of propylene which has been nucleated according to BNT-technology as described below.

It is preferred that the nucleating agent is introduced to the polypropylene (PP) during the polymerisation process of one of the components of the polypropylene (PP) or one of its components. The nucleating agent is preferably introduced to the polypropylene (PP) or one of its components by first polymerising the above defined vinyl compound, preferably vinylcycloalkane, as defined above or below, in the presence of a catalyst system comprising a solid catalyst component, preferably a solid Ziegler Natta catalyst component, a cocatalyst and optional external donor, and the obtained reaction mixture of the polymer of the vinyl compound, preferably vinyl cyclohexane (VCH) polymer, and the catalyst system is then used for producing the polypropylene (PP) or one of its components. The above incorporation of the polymeric nucleating agent to the polypropylene (PP) during the polymerization of said propylene copolymer is called herein as BNT-technology as described below.

Said obtained reaction mixture is herein below referred interchangeably as modified catalyst system.

Preferably the vinylcycloalkane is vinylcyclohexane (VCH) polymer which is introduced into the propylene copolymer by the BNT technology.

More preferably in this preferred embodiment, the amount of vinylcycloalkane, like vinylcyclohexane (VCH), polymer and/or vinylalkane polymer, more preferably of vinylcyclohexane (VCH) polymer, in the polypropylene (PP), or of one of its components, preferably of the polypropylene (PP), is not more than 500 ppm, more preferably of 1 to 200 ppm, most preferably 5 to 100 ppm.

With regard to the BNT-technology reference is made to the international applications WO 99/24478, WO 99/24479 and particularly WO 00/68315. According to this technology a catalyst system, preferably a Ziegler-Natta procatalyst, can be modified by polymerising a vinyl compound in the presence of the catalyst system, comprising in particular the special Ziegler-Natta procatalyst, an external donor and a cocatalyst, which vinyl compound has the formula:

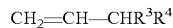

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the polypropylene (PP) according to this invention. The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

Suitable heterophasic polymers are for example described in EP 2251375.

Preferably a compatibilizer is added prior to step c). Usually the compatibilizer is comprised in the polymer composition (A) in step (A). If comprised in the polymer composition, the amount of compatibilizer is preferably 1.0 to 10 wt. %, more preferably 2.0 to 8.0 wt. % and most preferably 3.0 to 7.0 wt. % based on the polymer composition (A). In case added during or after step b) the weight ratio between compatibilizer and polymer composition a) is preferably within the range of 1:99 to 15:85, more preferably 2:98 to 10:90 and most preferably 3:97 to 8:92.

Polymer composition (A) may be a mechanical blend.

The compatibilizer preferably comprises a modified (functionalized) polymer and optionally a low molecular weight compound having reactive polar groups. Modified α-olefin polymers, in particular propylene homopolymers and copolymers, like copolymers of ethylene and propylene with each other or with other α-olefins, are most preferred, as they are highly compatible with the polymers of the fiber reinforced composition. Modified polyethylene can be used as well.

The compatibilizer is preferably a polar modified polypropylene (PMP).

The polar modified polypropylene (PMP) preferably is a polypropylene containing polar groups.

The polypropylene is preferably a propylene homopolymer or copolymer, like a copolymer of propylene with other α-olefins, like ethylene.

Preferably, the polar modified polypropylene (PMP) is a propylene copolymer comprising ethylene as comonomer units. Preferably, the polar modified polypropylene (PMP) is a random propylene copolymer comprising ethylene as comonomer units.

The term "random propylene copolymer" indicates that the comonomers within the propylene copolymer are randomly distributed. The randomness defines the amount of isolated comonomer units, i.e. those which have no neighbouring comonomer units, compared to the total amount of comonomers in the polymer chain. In a preferred embodiment, the randomness of the random propylene copolymer is at least 30%, more preferably at least 50%, even more preferably at least 60%, and still more preferably at least 65%, based on the total weight of the random propylene copolymer. Accordingly the expression "random propylene copolymer" according to the present invention does not define a polymer of complex structures but a one phase system in contrast to a heterophasic system. Accordingly, the expression "random propylene copolymer" defines a polymer which backbone or its side chains contains to some extent α-olefins other than propylene.

Preferably, the units derivable from propylene constitutes the main part of the propylene copolymer, preferably the random propylene copolymer, i.e. at least 90 wt.-%, more preferably in the range of 94 to 99.5 wt.-%, yet more preferably of 94 to 98 wt.-%, even more preferably of 94 to 96 wt.-%, and most preferably of 94 to 95 wt.-%, such as from 94.3 to 94.6 wt.-%, based on the total weight of the propylene copolymer. Accordingly, the amount of units derived from ethylene in the propylene copolymer, preferably the random propylene copolymer, is at most 10 wt.-%, more preferably in the range of 0.5 to 6 wt.-%, yet more preferably of 2 to 6 wt.-%, even more preferably of 4 to 6 wt.-%, and most preferably of 5 to 6 wt.-%, such as of 5.4 to 5.7 wt.-%, based on the total weight of the propylene copolymer. It is in particular appreciated that the propylene copolymer, preferably the random propylene copolymer, only comprises units derivable from propylene and ethylene.

Preferably, the random propylene copolymer is isotactic. Accordingly, it is appreciated that the random propylene copolymer has a rather high pentad concentration, i.e. higher than 95 mol-%, more preferably higher than 97 mol-%, still more preferably higher than 98 mol-%.

Additionally, it is appreciated that the propylene copolymer, preferably the random propylene copolymer, has a melting temperature Tm in the range of 125 to 140° C., more preferably ranges from 128 to 138° C. and most preferably ranges from 131 to 136° C.

Additionally or alternatively, the propylene copolymer, preferably the random propylene copolymer, has a melt flow rate $MFR_2$ (230° C.) measured according to ISO 1133 in the range from 1 to 30 g/10 min, preferably in the range of 1 to 20 g/10 min, more preferably in the range of 1 to 10 g/10 min, and most preferably in the range of 2 to 6 g/10 min.

It is appreciated that the polar modified polypropylene (PMP) comprises groups derived from polar groups. In this context, preference is given to polar modified polypropylene (PMP) comprising groups derived from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar groups are unsaturated cyclic anhydrides and their aliphatic diesters, and the diacid derivatives. In particular, one can use maleic anhydride and compounds selected from C1 to C10 linear and branched dialkyl maleates, C1 to C10 linear and branched dialkyl fumarates, itaconic anhydride, C1 to C10 linear and branched itaconic acid dialkyl esters, maleic acid, fumaric acid, itaconic acid and mixtures thereof.

In terms of structure, the polar modified polypropylene (PMP) is preferably selected from graft or block copolymers.

Preferably the polar modified polypropylene (PMP), i.e. the compatibilizer, is a propylene polymer grafted with such polar group.

Particular preference is given to using a propylene polymer grafted with maleic anhydride as the polar modified polypropylene (PMP), i.e. the compatibilizer.

In one embodiment, the polar modified polypropylene (PMP) is a propylene copolymer grafted with maleic anhydride, preferably the propylene copolymer grafted with maleic anhydride comprises ethylene as comonomer units.

In one specific embodiment, the polar modified polypropylene (PMP) is a random propylene copolymer grafted with maleic anhydride, preferably the random propylene copolymer grafted with maleic anhydride comprises ethylene as comonomer units.

In order to achieve the desired dispersion of the fibres, preferably the preferred carbon fibres, in the polymer components ensuring that the fiber reinforced polymer composition provides the well-balanced mechanical properties such as high stiffness and impact at light weight, it is appreciated that the polar modified polypropylene (PMP) comprises an amount of groups deriving from polar groups which is higher than that typically used in polar modified polypropylenes considered for polypropylenes.

Required amounts of groups deriving from polar groups in the polar modified polypropylene (PMP) are thus from 1 to 5 wt.-%, based on the total weight of the polar modified polypropylene (PMP). Preferably, the amounts of groups deriving from polar groups in the polar modified polypropylene (PMP) are from 1.5 to 4 wt.-%, more preferably from 2 to 3 wt.-%, most preferably from 2 to 2.8 wt.-%, such as from 2.2 to 2.4 wt.-%, based on the total weight of the polar modified polypropylene (PMP).

Preferred values of the melt flow index MFI (170° C.; 1.2 kg) measured according to ISO 1133 for the polar modified polypropylene (PMP) are from 10 to 150 cm$^3$/10 min, like in the range of 30 to 120 cm$^3$/10 min. For example, the polar modified polypropylene (PMP) has a melt flow index MFI (170° C.; 1.2 kg) measured in line with the general provisions of ISO 1133 from 50 to 100 cm$^3$/10 min, of from 60 to 80 cm$^3$/10 min.

Additionally or alternatively, it is appreciated that the polar modified polypropylene (PMP) preferably has a melting temperature Tm in the range of 110 to 160° C., more preferably ranges from 125 to 145° C.

The polar modified polypropylene (PMP) can be produced by in a simple manner by a two-step grafting process comprising a solid stage grafting step as for example disclosed in WO 2002/093157 A2 and a melt stage grafting step as well-known in the art.

The polar modified polypropylene (PMP) is known in the art and commercially available. A suitable example is SCONA TSPP 3598 GB of BYK.

The polymer composition (A) may further comprise an ethylene homo- or copolymer (E).

The amount of ethylene homo- or copolymer (E) is preferably from 2.5 to 40 wt. % based on the polymer composition (A) more preferably 5.0 to 30 wt. % based on the polymer composition (A) and most preferably 10 to 20 wt. % based on the polymer composition (A).

(E) is preferably an ethylene copolymer (EC), usually comprising 1.0 to 50 wt. % comonomer, preferably 10 to 45 wt. % comonomer and most preferably 25 to 40 wt. % comonomer.

The comonomer is preferably selected from the group consisting of $C_3$ α-olefin, $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably the ethylene copolymer (EC) comprises units derived from propylene, 1-butene, 1-pentene, 1-hexene, 1-heptene, 1-octene, 1-nonene and 1-decene, wherein 1-hexene and 1-octene are preferred. It is in particular preferred that the ethylene copolymer (EC) consists of units derived from ethylene and 1-octene.

The Melt Flow Rate

The MFR (190° C., 2.16 kg, ISO 1133) is preferably from 0.05 to 100 g/10 min, more preferably from 0.10 to 75 g/10 min and most preferably from 0.50 to 50 g/10 min.

A suitable polymer is ENGAGE™ 8100 which is an ethylene octene copolymer containing 35.5 wt % of octene and having a melt index (MI at 190° C., 2.16 kg) of 1 g/10 min and a density of 0.87 g/cm$^3$.

Usually the non-woven fabric is added to the polymer (A) in the compounding device after usual additives have been added and mixing thereof has been accomplished completely or to a large extent in order to keep the extent of mixing performed on the polymer melt comprising the fibres as low as possible.

In one variant the present invention is directed to a process for producing a fibre-reinforced polymer composition comprising the following steps
  a) providing a polymer composition (A);
  b) melting the polymer composition (A) in a compounding device;
  c) feeding a non-woven fabric into the compounding device in the presence of the molten polymer composition (A);
  d) withdrawing the fibre-reinforced polymer composition from the compounding device, whereby the non-woven fabric is obtained by needle-punching.

Preferred features of the process according to the present invention are also preferred features of this variant of the process according to the present invention.

The present invention is furthermore directed to the product obtainable by the process according to the invention.

Furthermore the present invention is directed to the use of a non-woven fabric in a compounding device to reinforce a polymer (A) with fibres.

The preferred features of the process according to the present invention are also preferred features of the article and the use according to the present invention.

The present invention will now be described by the following non-limiting examples.

Experimental Part

Measurement Methods

Density

All densities are measured according to ISO 1183-187. Sample preparation is done by compression moulding in accordance with ISO 1872-2:2007.

Melt Flow Rate (MFR)

The MFR is determined according to ISO 1133.

Fibre Content:

The ash content is measured according to ISO-3451-1 and ISO-1172 at 500° C. and with 1 hour testing time. After 1 hour the residual amount is taken as the content including carbon and glass fibers.

Average Fiber Diameter

Average fiber diameter is determined according to ISO 1888:2006(E), Method B, microscope magnification of 1000.

Tensile Modulus:

The tensile modulus was measured according to ISO 527-2 (cross head speed=1 mm/min; 23° C.) using injection moulded specimens as described in EN ISO 1873-2 (dog bone shape, 4 mm thickness).

Charpy (Notched) Impact Strength:

The Charpy (notched) impact strength (Charpy NIS/IS) is measured according to ISO 179 2C/DIN 53453 at 23° C. and −20° C., using injection molded bar test specimens of 80×10×4 mm$^3$ prepared in accordance with ISO 294-1:1996.

Melting Temperature $T_m$, Crystallization Temperature $T_c$,

This has been measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and crystallization enthalpy (Hc) are determined from the cooling step, while melting temperature and melting enthalpy (Hm) are determined from the second heating step.

Number Average Molecular Weight ($M_n$), Weight Average Molecular Weight ($M_w$)

Molecular weight averages Mw and Mn were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

EXAMPLES

In all examples a co-rotational twin-screw extruder (ZSK 40 from Coperion) has been used. As side-feeder a Coperion ZSB40 twin screw side feeder has been used.

The following process parameters were used:
throughput of 100 kg/h
screw speed of 100-150 rpm
barrel temperatures of 250° C. flat
die plate with 5 mm holes, whereby 3 holes were opened
Non-Woven Fabric:

The non-woven fabric comprises 80 wt. % of carbon fibres and has been produced by needle-punching. The average fiber diameter is 7 μm.

The polymer and the additives different from the non-woven fabric are fed to the extruder and melt-kneaded in the 4$^{th}$ barrel of the extruder which consists of three kneading blocks (two times a KB 45/5/40, followed by a KB 45/5/20 LH) and a left-handed conveying element. The non-woven fabric is added in the 6$^{th}$ barrel using a side feeder. A second kneading zone located in the 8$^{th}$ barrel and consisting of three kneading blocks (KB 45/5/20) is used to distribute the carbon fibres homogeneously.

Moreover, two TME elements (one TME 22.5/20 and one TME 22.5/20 LH) located between the 8$^{th}$ and the 9$^{th}$ barrel are used to further distribute the carbon fibres.

The following compositions have been prepared.

|  |  | CE1 | IE1 |
| --- | --- | --- | --- |
| CF laid web | [wt %] | 20.0 |  |
| CF non-woven fabric | [wt %] |  | 20.0 |
| HF955MO[1)] | [wt %] | 64.85 | 63.5 |
| Engage 8100[2)] | [wt %] | 10.0 | 10.0 |
| SCONA TSPP 3598 GB[3)] | [wt %] | 5.0 | 5.0 |
| Kinox-B15[4)] | [wt %] | 0.15 | 0.15 |
| CF content | [wt %] | 20.35 | 19.82 |
| Tensile modulus | [MPa] | 11279 | 10901 |
| Tensile strength | [MPa] | 107.7 | 110.9 |
| Impact strength unnotched | [kJ/m$^2$] | 31.58 | 31.33 |
| Impact strength notched | [kJ/m$^2$] | 6.53 | 6.55 |

[1)] a propylene homopolymer distributed by Borealis having a density of 905 kg/m$^3$, a melt flow rate (230° C., 2.16 kg, ISO 1133) of 20 g/10 min and a melting temperature of 167° C.;
[2)] an ethylene-octene copolymer distributed by The Dow Chemical Company having a density of 870 kg/m$^3$ and a melt flow rate (190° C., 2.16 kg, ISO 1133) of 1.0 g/10 min;
[3)] compatibilizer distributed by BYK;
[4)] additive package distributed by High Polymer Labs In comparative example 1 the laid web was fed manually to the compounding device whereby the initially targeted fibre content was 15 wt. % which, however, could not be reached by manual feeding. Hence, for comparison purposes a composition comprising the same amount of fibres but using the non-woven fabric according to the invention has been produced using the side-feeder. The physical properties of CE1 and IE1 are similar. However, manual feeding as required in CE1 is not feasible in an industrial-scale process. Moreover, it has not been possible to reach the desired final carbon fibre content using manual feed. Using the process of the invention the desired fibre content in the final composition can be easily adjusted by adjusting the feed speed of the side feeder.

The invention claimed is:

1. A process for producing a fibre-reinforced polymer composition comprising the following steps:
    a) providing a polymer composition (A);
    b) melting the polymer composition (A) in a compounding device;
    c) feeding a non-woven fabric into the compounding device in the presence of the molten polymer composition (A), wherein the non-woven fabric comprises at least 75 wt. % carbon fibres based on the total weight of the non-woven fabric; and
    d) withdrawing the fibre-reinforced polymer composition from the compounding device.

2. The process according to claim 1, wherein the compounding device is an extruder.

3. The process according to claim 1, wherein the non-woven fabric is fed into the compounding device through a side feed port.

4. The process according to claim 1, wherein the non-woven fabric further comprises glass reinforcing fibres.

5. The process according to claim 1, wherein the non-woven fabric is in the form of a stripe.

6. The process according to claim 5, wherein the stripe has a width of 10 to 300 mm.

7. The process according to claim 5, wherein the stripe has a length of at least 50 cm.

8. The process according to claim 1, wherein the average weight of the non-woven fabric is within the range of 100 to 1000 g/m$^2$.

9. The process according to claim 1, wherein the polymer composition (A) comprises a polyolefin.

10. The process according to claim 9, wherein the content of the polyolefin is at least 50 wt. % based on the polymer composition (A).

11. The process according to claim 9, wherein the polymer composition (A) comprises a polypropylene.

12. The process according to claim 1, wherein a compatibilizer is added prior to step c).

13. The process according to claim 1, wherein the non-woven fabric is obtained by needle-punching.

* * * * *

UNITED STATES PATENT AND TRADEMARK OFFICE
CERTIFICATE OF CORRECTION

| | | |
|---|---|---|
| PATENT NO. | : 10,792,837 B2 | Page 1 of 1 |
| APPLICATION NO. | : 15/571773 | |
| DATED | : October 6, 2020 | |
| INVENTOR(S) | : Hochradl et al. | |

It is certified that error appears in the above-identified patent and that said Letters Patent is hereby corrected as shown below:

On the Title Page

Item (12):
Please remove "Hochradi et al."
Please add --Hochradl et al.--

Item (72) Applicants:
Please remove "Stefan Hochradi, Linz (AT)"
Please add --Stefan Hochradl, Linz (AT)--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*